United States Patent
Kawai et al.

(10) Patent No.: US 8,626,761 B2
(45) Date of Patent: Jan. 7, 2014

(54) SYSTEM AND METHOD FOR SCORING CONCEPTS IN A DOCUMENT SET

(75) Inventors: Kenji Kawai, Seattle, WA (US); Lynne Marie Evans, Renton, WA (US)

(73) Assignee: FTI Technology LLC, Annapolis, MD (US)

(*) Notice: Subject to any disclaimer, the term of this patent is extended or adjusted under 35 U.S.C. 154(b) by 424 days.

(21) Appl. No.: 12/606,171

(22) Filed: Oct. 26, 2009

(65) Prior Publication Data

US 2010/0049708 A1    Feb. 25, 2010

Related U.S. Application Data

(63) Continuation of application No. 10/626,984, filed on Jul. 25, 2003, now Pat. No. 7,610,313.

(51) Int. Cl.
*G06F 7/00* (2006.01)

(52) U.S. Cl.
USPC .......................................... 707/736

(58) Field of Classification Search
USPC .................. 707/999.102, 999.104, 999.101
See application file for complete search history.

(56) References Cited

U.S. PATENT DOCUMENTS

| | | | |
|---|---|---|---|
| 3,416,150 A | 12/1968 | Lindberg | |
| 3,426,210 A | 2/1969 | Agin | |
| 3,668,658 A | 6/1972 | Flores et al. | |
| 4,893,253 A | 1/1990 | Lodder | |
| 5,056,021 A | 10/1991 | Ausborn | |
| 5,121,338 A | 6/1992 | Lodder | |
| 5,133,067 A | 7/1992 | Hara et al. | |
| 5,278,980 A | 1/1994 | Pedersen et al. | |
| 5,371,673 A | 12/1994 | Fan | |

(Continued)

FOREIGN PATENT DOCUMENTS

| | | |
|---|---|---|
| EP | 1 024 437 | 8/2000 |
| EP | 1024437 | 8/2000 |

(Continued)

OTHER PUBLICATIONS

Artero et al., "Viz3D: Effective Exploratory Visualization of Large Multidimensional Data Sets," IEEE Computer Graphics and Image Processing 2004, pp. 340-347 (Oct. 20, 2004).

(Continued)

*Primary Examiner* — Syling Yen
*Assistant Examiner* — Eliyah S Harper
(74) *Attorney, Agent, or Firm* — Patrick J. S. Inouye; Krista A. Wittman; Leonid Kisselev

(57) ABSTRACT

A system and method for scoring concepts in a document set is provided. Concepts including two or more terms extracted from the document set are identified. Each document having one or more of the concepts is designated as a candidate seed document. A score is calculated for each of the concepts identified within each candidate seed document based on a frequency of occurrence, concept weight, structural weight, and corpus weight. A vector is formed for each candidate seed document. The vector is compared with a center of one or more clusters each comprising thematically-related documents. At least one of the candidate seed documents that is sufficiently distinct from the other candidate seed documents is selected as a seed document for a new cluster. Each of the unselected candidate seed documents is placed into one of the clusters having a most similar cluster center.

16 Claims, 13 Drawing Sheets

(56) References Cited

U.S. PATENT DOCUMENTS

| | | | |
|---|---|---|---|
| 5,442,778 A | 8/1995 | Pedersen et al. | |
| 5,477,451 A | 12/1995 | Brown et al. | |
| 5,488,725 A | 1/1996 | Turtle et al. | |
| 5,524,177 A | 6/1996 | Suzuoka | |
| 5,528,735 A | 6/1996 | Strasnick et al. | |
| 5,619,632 A | 4/1997 | Lamping et al. | |
| 5,619,709 A * | 4/1997 | Caid et al. | 715/209 |
| 5,635,929 A | 6/1997 | Rabowsky et al. | |
| 5,649,193 A | 7/1997 | Sumita et al. | |
| 5,675,819 A | 10/1997 | Schuetze | |
| 5,696,962 A | 12/1997 | Kupiec | |
| 5,737,734 A | 4/1998 | Schultz | |
| 5,754,938 A | 5/1998 | Herz et al. | |
| 5,794,178 A * | 8/1998 | Caid et al. | 704/9 |
| 5,794,236 A | 8/1998 | Mehrle | |
| 5,799,276 A | 8/1998 | Komissarchik et al. | |
| 5,819,258 A | 10/1998 | Vaithyanathan et al. | |
| 5,835,905 A * | 11/1998 | Pirolli et al. | 1/1 |
| 5,842,203 A | 11/1998 | D'Elena et al. | |
| 5,844,991 A | 12/1998 | Hochberg et al. | |
| 5,857,179 A | 1/1999 | Vaithyanathan et al. | |
| 5,860,136 A | 1/1999 | Fenner | |
| 5,862,325 A | 1/1999 | Reed et al. | |
| 5,864,846 A | 1/1999 | Voorhees et al. | |
| 5,864,871 A | 1/1999 | Kitain et al. | |
| 5,867,799 A | 2/1999 | Lang et al. | |
| 5,870,740 A | 2/1999 | Rose et al. | |
| 5,895,470 A * | 4/1999 | Pirolli et al. | 707/727 |
| 5,909,677 A | 6/1999 | Broder et al. | |
| 5,915,024 A | 6/1999 | Kitaori et al. | |
| 5,920,854 A | 7/1999 | Kirsch et al. | |
| 5,940,821 A | 8/1999 | Wical | |
| 5,943,669 A * | 8/1999 | Numata | 1/1 |
| 5,950,146 A | 9/1999 | Vapnik | |
| 5,950,189 A | 9/1999 | Cohen et al. | |
| 5,966,126 A | 10/1999 | Szabo | |
| 5,987,446 A | 11/1999 | Corey et al. | |
| 6,006,221 A | 12/1999 | Liddy et al. | |
| 6,012,053 A | 1/2000 | Pant et al. | |
| 6,026,397 A | 2/2000 | Sheppard | |
| 6,038,574 A | 3/2000 | Pitkow et al. | |
| 6,070,133 A | 5/2000 | Brewster et al. | |
| 6,089,742 A | 7/2000 | Warmerdam et al. | |
| 6,094,649 A | 7/2000 | Bowen et al. | |
| 6,100,901 A | 8/2000 | Mohda et al. | |
| 6,119,124 A | 9/2000 | Broder et al. | |
| 6,122,628 A | 9/2000 | Castelli et al. | |
| 6,137,499 A | 10/2000 | Tesler | |
| 6,137,545 A | 10/2000 | Patel et al. | |
| 6,137,911 A * | 10/2000 | Zhilyaev | 382/225 |
| 6,148,102 A | 11/2000 | Stolin | |
| 6,154,219 A | 11/2000 | Wiley et al. | |
| 6,167,368 A | 12/2000 | Wacholder | |
| 6,173,275 B1 | 1/2001 | Caid et al. | |
| 6,202,064 B1 | 3/2001 | Julliard | |
| 6,216,123 B1 | 4/2001 | Robertson et al. | |
| 6,243,713 B1 | 6/2001 | Nelson et al. | |
| 6,243,724 B1 | 6/2001 | Mander et al. | |
| 6,260,038 B1 | 7/2001 | Martin et al. | |
| 6,326,962 B1 | 12/2001 | Szabo | |
| 6,338,062 B1 | 1/2002 | Liu | |
| 6,345,243 B1 | 2/2002 | Clark | |
| 6,349,296 B1 | 2/2002 | Broder et al. | |
| 6,349,307 B1 | 2/2002 | Chen | |
| 6,360,227 B1 | 3/2002 | Aggarwal et al. | |
| 6,363,374 B1 | 3/2002 | Corston-Oliver et al. | |
| 6,377,287 B1 | 4/2002 | Hao et al. | |
| 6,381,601 B1 | 4/2002 | Fujiwara et al. | |
| 6,389,433 B1 | 5/2002 | Bolonsky et al. | |
| 6,389,436 B1 | 5/2002 | Chakrabarti et al. | |
| 6,408,294 B1 | 6/2002 | Getchius et al. | |
| 6,414,677 B1 | 7/2002 | Robertson et al. | |
| 6,415,283 B1 | 7/2002 | Conklin | |
| 6,418,431 B1 | 7/2002 | Mahajan et al. | |
| 6,421,709 B1 | 7/2002 | McCormick et al. | |
| 6,438,537 B1 | 8/2002 | Netz et al. | |
| 6,438,564 B1 | 8/2002 | Morton et al. | |
| 6,442,592 B1 | 8/2002 | Alumbaugh et al. | |
| 6,446,061 B1 | 9/2002 | Doerre et al. | |
| 6,449,612 B1 | 9/2002 | Bradley et al. | |
| 6,453,327 B1 | 9/2002 | Nielsen | |
| 6,460,034 B1 | 10/2002 | Wical | |
| 6,470,307 B1 | 10/2002 | Turney | |
| 6,480,843 B2 | 11/2002 | Li | |
| 6,480,885 B1 | 11/2002 | Olivier | |
| 6,484,168 B1 | 11/2002 | Pennock et al. | |
| 6,484,196 B1 | 11/2002 | Maurille | |
| 6,493,703 B1 | 12/2002 | Knight et al. | |
| 6,496,822 B2 | 12/2002 | Rosenfelt et al. | |
| 6,502,081 B1 | 12/2002 | Wiltshire, Jr. et al. | |
| 6,507,847 B1 | 1/2003 | Fleischman | |
| 6,510,406 B1 | 1/2003 | Marchisio | |
| 6,519,580 B1 | 2/2003 | Johnson et al. | |
| 6,523,026 B1 | 2/2003 | Gillis | |
| 6,523,063 B1 | 2/2003 | Miller et al. | |
| 6,542,889 B1 | 4/2003 | Aggarwal et al. | |
| 6,544,123 B1 | 4/2003 | Tanaka et al. | |
| 6,549,957 B1 | 4/2003 | Hanson et al. | |
| 6,560,597 B1 | 5/2003 | Dhillon et al. | |
| 6,571,225 B1 | 5/2003 | Oles et al. | |
| 6,584,564 B2 | 6/2003 | Olkin et al. | |
| 6,594,658 B2 | 7/2003 | Woods | |
| 6,598,054 B2 | 7/2003 | Schuetze et al. | |
| 6,606,625 B1 | 8/2003 | Muslea et al. | |
| 6,611,825 B1 * | 8/2003 | Billheimer et al. | 706/45 |
| 6,628,304 B2 | 9/2003 | Mitchell et al. | |
| 6,629,097 B1 | 9/2003 | Keith | |
| 6,651,057 B1 | 11/2003 | Jin et al. | |
| 6,654,739 B1 | 11/2003 | Apte et al. | |
| 6,658,423 B1 | 12/2003 | Pugh et al. | |
| 6,675,159 B1 | 1/2004 | Lin et al. | |
| 6,675,164 B2 | 1/2004 | Kamath et al. | |
| 6,678,705 B1 | 1/2004 | Berchtold et al. | |
| 6,684,205 B1 | 1/2004 | Modha et al. | |
| 6,697,998 B1 | 2/2004 | Damerau et al. | |
| 6,701,305 B1 | 3/2004 | Holt et al. | |
| 6,711,585 B1 | 3/2004 | Copperman et al. | |
| 6,714,929 B1 | 3/2004 | Micaelian et al. | |
| 6,735,578 B2 | 5/2004 | Shetty et al. | |
| 6,738,759 B1 | 5/2004 | Wheeler et al. | |
| 6,747,646 B2 | 6/2004 | Gueziec et al. | |
| 6,751,628 B2 | 6/2004 | Coady | |
| 6,757,646 B2 * | 6/2004 | Marchisio | 704/8 |
| 6,785,679 B1 | 8/2004 | Dane et al. | |
| 6,804,665 B2 | 10/2004 | Kreulen et al. | |
| 6,816,175 B1 | 11/2004 | Hamp et al. | |
| 6,819,344 B2 | 11/2004 | Robbins | |
| 6,823,333 B2 | 11/2004 | McGreevy | |
| 6,841,321 B2 | 1/2005 | Matsumoto et al. | |
| 6,847,966 B1 * | 1/2005 | Sommer et al. | 707/739 |
| 6,862,710 B1 | 3/2005 | Marchisio | |
| 6,879,332 B2 | 4/2005 | Decombe | |
| 6,883,001 B2 | 4/2005 | Abe | |
| 6,886,010 B2 | 4/2005 | Kostoff | |
| 6,888,584 B2 | 5/2005 | Suzuki et al. | |
| 6,915,308 B1 | 7/2005 | Evans et al. | |
| 6,922,699 B2 | 7/2005 | Schuetze et al. | |
| 6,941,325 B1 | 9/2005 | Benitez et al. | |
| 6,970,881 B1 | 11/2005 | Mohan et al. | |
| 6,978,274 B1 * | 12/2005 | Gallivan et al. | 1/1 |
| 6,978,419 B1 | 12/2005 | Kantrowitz | |
| 6,990,238 B1 | 1/2006 | Saffer et al. | |
| 6,996,575 B2 | 2/2006 | Cox et al. | |
| 7,003,551 B2 | 2/2006 | Malik | |
| 7,020,645 B2 | 3/2006 | Bisbee et al. | |
| 7,051,017 B2 | 5/2006 | Marchisio | |
| 7,054,870 B2 | 5/2006 | Holbrook | |
| 7,080,320 B2 | 7/2006 | Ono | |
| 7,096,431 B2 | 8/2006 | Tambata et al. | |
| 7,099,819 B2 | 8/2006 | Sakai et al. | |
| 7,117,246 B2 | 10/2006 | Christenson et al. | |
| 7,130,807 B1 | 10/2006 | Mikurak | |
| 7,137,075 B2 | 11/2006 | Hoshito et al. | |
| 7,146,361 B2 | 12/2006 | Broder et al. | |

(56) References Cited

U.S. PATENT DOCUMENTS

| | | | |
|---|---|---|---|
| 7,155,668 | B2 | 12/2006 | Holland et al. |
| 7,158,957 | B2 * | 1/2007 | Joseph et al. ................. 706/12 |
| 7,188,107 | B2 | 3/2007 | Moon et al. |
| 7,188,117 | B2 | 3/2007 | Farahat et al. |
| 7,194,458 | B1 | 3/2007 | Micaelian et al. |
| 7,194,483 | B1 | 3/2007 | Mohan et al. |
| 7,197,497 | B2 | 3/2007 | Cossock |
| 7,209,949 | B2 | 4/2007 | Mousseau et al. |
| 7,233,940 | B2 | 6/2007 | Bamberger et al. |
| 7,240,199 | B2 | 7/2007 | Tomkow |
| 7,246,113 | B2 | 7/2007 | Cheetham et al. |
| 7,251,637 | B1 * | 7/2007 | Caid et al. .................... 706/15 |
| 7,266,365 | B2 | 9/2007 | Ferguson et al. |
| 7,266,545 | B2 | 9/2007 | Bergman et al. |
| 7,269,598 | B2 | 9/2007 | Marchisio |
| 7,271,801 | B2 | 9/2007 | Toyozawa et al. |
| 7,277,919 | B1 | 10/2007 | Donoho et al. |
| 7,308,451 | B1 * | 12/2007 | Lamping et al. ............ 707/737 |
| 7,325,127 | B2 | 1/2008 | Olkin et al. |
| 7,353,204 | B2 | 4/2008 | Liu |
| 7,363,243 | B2 | 4/2008 | Arnett et al. |
| 7,366,759 | B2 | 4/2008 | Trevithick et al. |
| 7,379,913 | B2 | 5/2008 | Steele et al. |
| 7,383,282 | B2 | 6/2008 | Whitehead et al. |
| 7,401,087 | B2 | 7/2008 | Copperman et al. |
| 7,412,462 | B2 | 8/2008 | Margolus et al. |
| 7,418,397 | B2 | 8/2008 | Kojima et al. |
| 7,444,356 | B2 | 10/2008 | Calistri-Yeh et al. |
| 7,457,948 | B1 | 11/2008 | Bilicksa et al. |
| 7,472,110 | B2 | 12/2008 | Achlioptas |
| 7,490,092 | B2 | 2/2009 | Sibley et al. |
| 7,523,349 | B2 | 4/2009 | Barras |
| 7,571,177 | B2 | 8/2009 | Damle |
| 7,607,083 | B2 * | 10/2009 | Gong et al. ................... 715/254 |
| 7,647,345 | B2 | 1/2010 | Trepess et al. |
| 7,698,167 | B2 | 4/2010 | Batham et al. |
| 7,971,150 | B2 * | 6/2011 | Raskutti et al. ............. 715/764 |
| 2002/0002556 | A1 * | 1/2002 | Yoshida et al. ............. 707/102 |
| 2002/0032735 | A1 | 3/2002 | Burnstein et al. |
| 2002/0065912 | A1 | 5/2002 | Catchpole et al. |
| 2002/0078090 | A1 | 6/2002 | Hwang et al. |
| 2002/0122543 | A1 | 9/2002 | Rowen |
| 2002/0156763 | A1 * | 10/2002 | Marchisio ........................ 707/1 |
| 2002/0184193 | A1 | 12/2002 | Cohen |
| 2003/0130991 | A1 | 7/2003 | Reijerse et al. |
| 2003/0172048 | A1 | 9/2003 | Kauffman |
| 2004/0024755 | A1 | 2/2004 | Rickard |
| 2004/0034633 | A1 | 2/2004 | Rickard |
| 2004/0205578 | A1 | 10/2004 | Wolff et al. |
| 2004/0215608 | A1 | 10/2004 | Gourlay |
| 2004/0243556 | A1 | 12/2004 | Ferrucci et al. |
| 2005/0004949 | A1 | 1/2005 | Trepess et al. |
| 2007/0020642 | A1 | 1/2007 | Deng et al. |

FOREIGN PATENT DOCUMENTS

| | | |
|---|---|---|
| EP | 1049030 | 11/2000 |
| EP | 0886227 | 10/2003 |
| WO | 0067162 | 11/2000 |
| WO | WO 03/052627 | 6/2003 |
| WO | WO 03/060766 | 7/2003 |

OTHER PUBLICATIONS

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234.

Vance Faber, "Clustering and the Continuous K-Means Algorithm," Los Alamos Science, The Laboratory, Los Alamos, NM, US, No. 22, Jan. 1, 1994, pp. 138-144.

D. Sullivan, "Document Warehousing And Text Mining, Techniques For Improving Business Operations, Marketing, And Sales," Chs. 1-3, Wiley Computer Publishing (2001).

Linhui, Jiang, "K-Mean Algorithm: Iterative Partitioning Clustering Algorithm," http://www.cs.regina.ca/~linhui/K_mean_algorithm.html, (2001) Computer Science Department, University of Regina, Saskatchewan, Canada.

Kanugo et al., "The Analysis Of A Simple K-Means Clustering Algorithm," pp. 100-109, PROC 16th annual symposium of computational geometry (May 2000).

Pelleg et al., "Accelerating Exact K-Means Algorithms With Geometric Reasoning," pp. 277-281, CONF on Knowledge Discovery in Data, PROC fifth ACM SIGKDD (1999).

Jain et al., "Data Clustering: A Review," vol. 31, No. 3, ACM Computing surveys, (Sep. 1999).

F. Can., "Incremental Clustering For Dynamic Information Processing," ACM Transactions On Information Systems, vol. 11, No. 1, pp. 143-164 (Apr. 1993).

Christina Yip Chung et al., "Thematic Mapping—From Unstructured Documents To Taxonomies," CIKM'02, Nov. 4-9, 2002, pp. 608-610, ACM, McLean, Virginia, USA.

Hiroyuki Kawano, "Overview of Mondou Web Search Engine Using Text Mining And Information Visualizing Technologies," IEEE, 2001, pp. 234-241.

James Osborn et al., "JUSTICE: A Judicial Search Tool Using Intelligent Concept Extraction," ICAIL-99, 1999, pp. 173-181, ACM.

Chen An et al., "Fuzzy Concept Graph And Application In Web Document Clustering," 2001, pp. 101-106, IEEE.

Baeza-Yates et al., "Modern Information Retrieval," Ch. 2 "Modeling," Modern Information Retrieval, Harlow: Addison-Wesley, Great Britain 1999, pp. 18-71 (1999).

Slaney et al., "Multimedia Edges: Finding Hierarchy in all Dimensions" PROC. 9-th ACM Intl. Conf. on Multimedia, pp. 29-40, ISBN. 1-58113-394-4, Sep. 30, 2001, XP002295016 OTTAWA (Sep. 3, 2001).

T. Kohonen, "Self-Organizing Maps," Ch. 1-2, Springer-Verlag (3rd ed.) (2001).

Anna Sachinopoulou, "Multidimensional Visualization," Technical Research Centre of Finland, ESPOO 2001, VTT Research Notes 2114, pp. 1-37 (2001).

Salton et al., "Estended Boolean Information Retrieval," Communications of the Association for Computing Machinery, ACM, New York, NY, USA, vol. 26, No. 12, pp. 1022-1036, XP000670417 (Nov. 1, 1983).

Jiang Linhui, "K-Mean Algorithm: Iterative Partitioning Clustering Algorithm," http://www.cs.regina.ca/-linhui/K.sub.--mean.sub.--algorithm.html, (2001) Computer Science Department, University of Regina, Saskatchewan, Canada (2001).

Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Davison et al., "Brute Force Estimation of the Number of Human Genes Using EST Clustering as a Measure," IBM Journal of Research & Development, vol. 45, pp. 439-447 (May 2001).

Lam et al., "A Sliding Window Technique for Word Recognition," SPIE, vol. 2422, pp. 38-46, Center of Excellence for Document Analysis and Recognition, State University of New Yrok at Baffalo, NY, USA (1995).

Eades et al. "Multilevel Visualization of Clustered Graphs," Department of Computer Science and Software Engineering, University if Newcastle, Australia, Proceedings of Graph Drawing '96, Lecture Notes in Computer Science, NR. 1190, Sep. 18, 1996-Sep. 20, 1996, pp. 101-112, Berkeley, CA, USA, ISBN: 3-540-62495-3 (Sep. 18, 1996).

http://em-ntserver.unl.edu/Math/mathweb/vecors/vectors.html © 1997.

North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).

(56) References Cited

OTHER PUBLICATIONS

R.E. Horn, "Communication Units, Morphology, and Syntax," Visual Language: Global Communication for the 21st Century, 1998, Ch. 3, pp. 51-92, MacroVU Press, Bainbridge Island, Washington, USA.

B.B. Hubbard, "The World According the Wavelet: The Story of a Mathematical Technique in the Making," AK Peters (2nd ed.), pp. 227-229, Massachusetts, USA (1998).

Whiting et al., "Image Quantization: Statistics and Modeling," SPIE Conference of Physics of Medical Imaging, San Diego, CA, USA, vol. 3336, pp. 260-271 (Feb. 1998).

Miller et al., "Topic Islands: A Wavelet Based Text Visualization System," Proceedings of the IEEE Visualization Conference. 1998, pp. 189-196.

Fekete et al., "Excentric Labeling: Dynamic Neighborhood Labeling For Data Visualization," CHI 1999 Conference Proceedings Human Factors In Computing Systems, Pittsburgh, PA, pp. 512-519 (May 15-20, 1999).

Estivill-Castro et al. "Amoeba: Hierarchical Clustering Based On Spatial Proximity Using Delaunaty Diagram", Department of Computer Science, The University of Newcastle, Australia, 1999 ACM Sigmod International Conference on Management of Data, vol. 28, No. 2, Jun. 1-Jun. 3, 1999 pp. 49-60, Philadelphia, PA, USA (Jun. 1, 1999).

Lio et al., "Funding Pathogenicity Islands And Gene Transfer Events in Genome Data," Bioinformatics, vol. 16, pp. 932-940, Department of Zoology, University of Cambridge, UK (Jan. 25, 2000).

Kurimo M., "Fast Latent Semantic Indexing of Spoken Documents by Using Self-Organizing Maps" IEEE International Conference on Accoustics, Speech, And Signal Processing, vol. 6, pp. 2425-2428 (Jun. 2000).

Magarshak, Greg., Theory & Practice. Issue 01. May 17, 2000. http://www.flipcode.com/articles/tp.sub.--issue01-pf.shtml (May 17, 2000).

Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809, ISBN: 0-7695-1988-1 (Jul. 16, 2003).

Rauber et al., "Text Mining in the SOMLib Digital Library System: The Representation of Topics and Genres," Applied Intelligence 18, pp. 271-293, 2003 Kluwer Academic Publishers (2003).

Boukhelifa et al., "A Model and Software System for Coordinated and Multiple Views in Exploratory Visualization," Information Visualization, No. 2, pp. 258-269, GB (2003).

\* cited by examiner

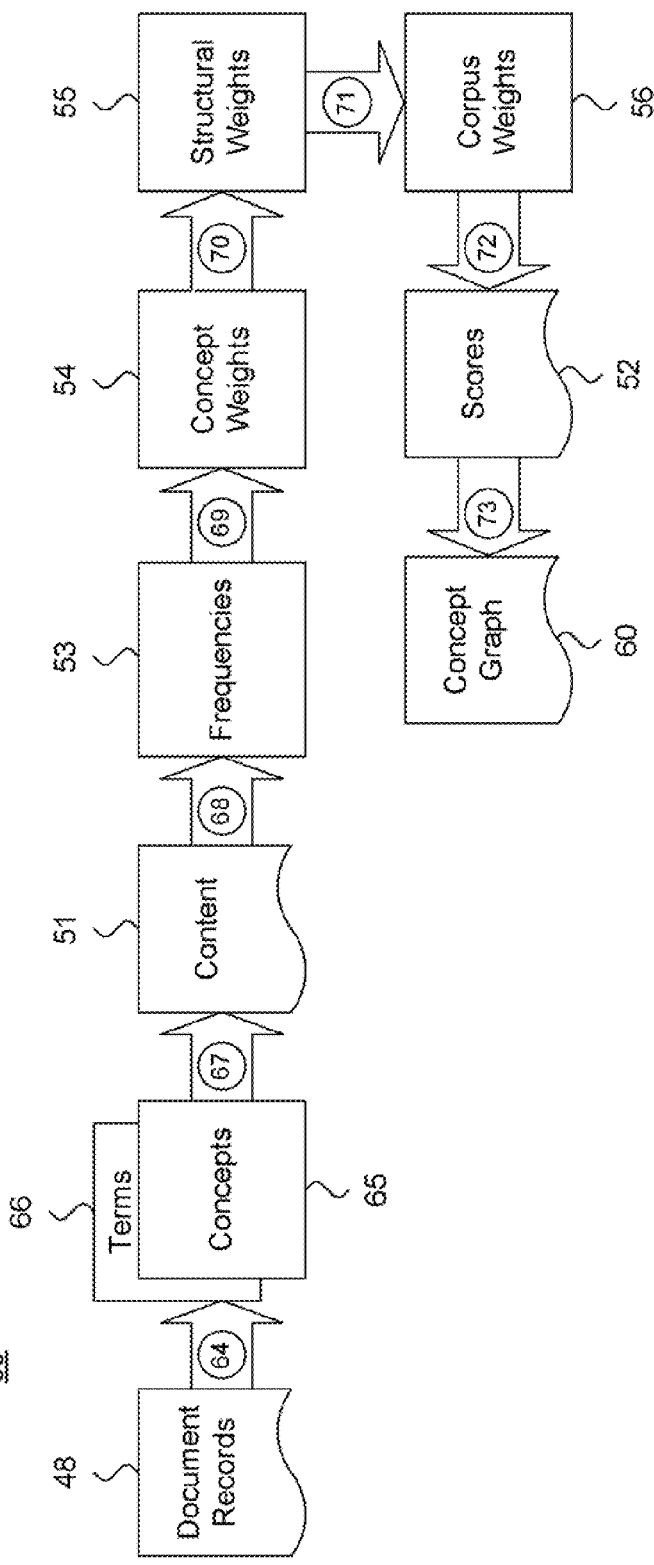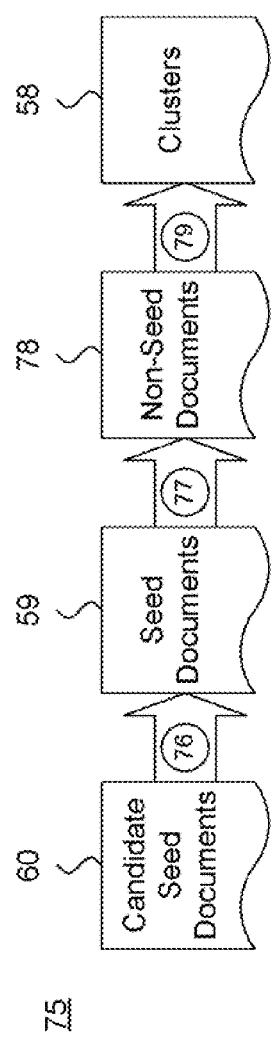

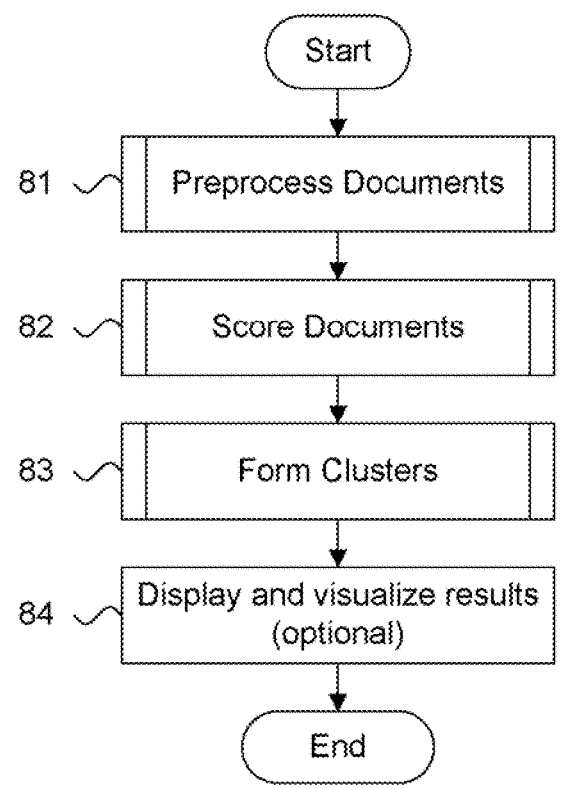

Fig. 7.

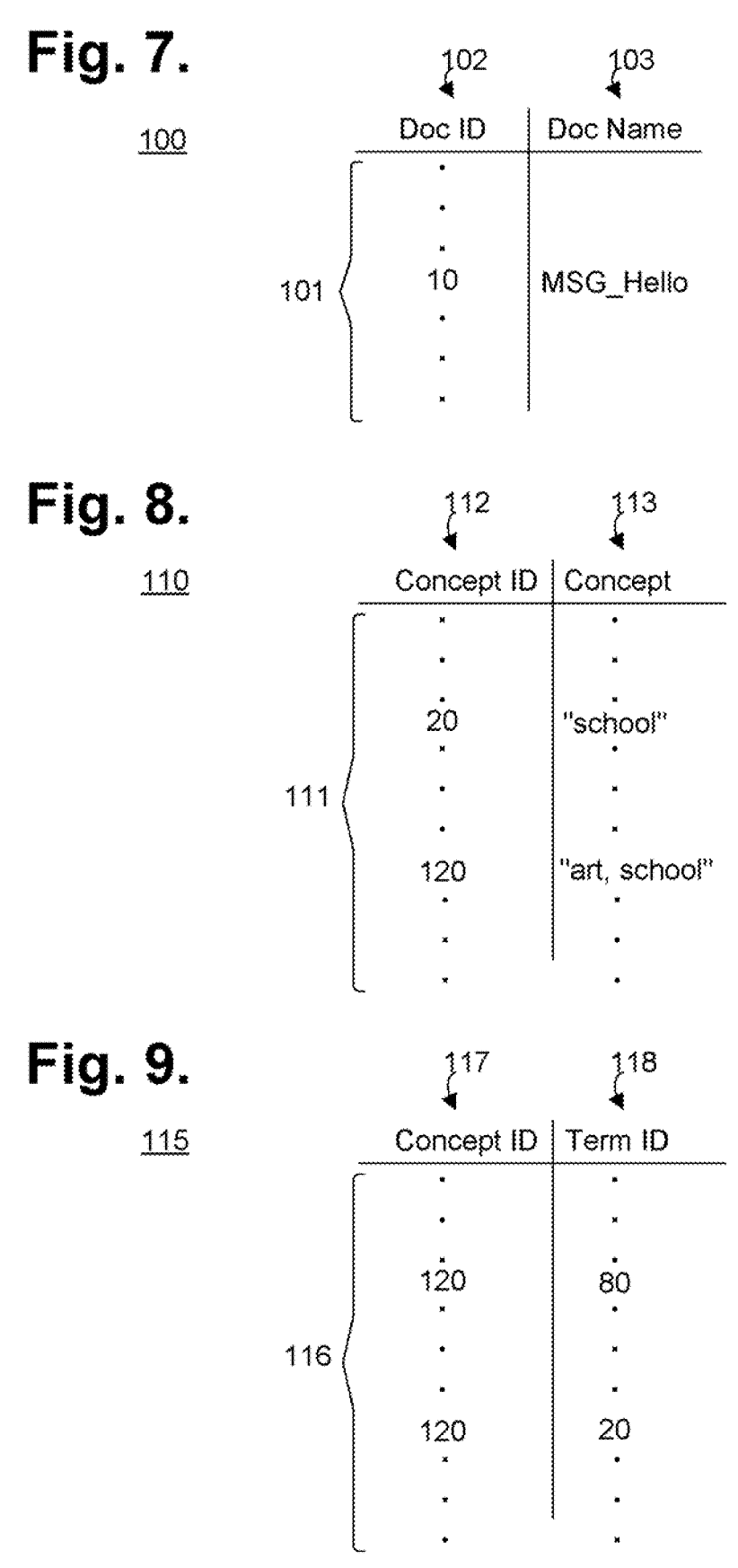

| Doc ID (102) | Doc Name (103) |
|---|---|
| ⋮ | ⋮ |
| 10 | MSG_Hello |
| ⋮ | ⋮ |

| Concept ID (112) | Concept (113) |
|---|---|
| ⋮ | ⋮ |
| 20 | "school" |
| ⋮ | ⋮ |
| 120 | "art, school" |
| ⋮ | ⋮ |

| Concept ID (117) | Term ID (118) |
|---|---|
| ⋮ | ⋮ |
| 120 | 80 |
| ⋮ | ⋮ |
| 120 | 20 |
| ⋮ | ⋮ |

115, 116

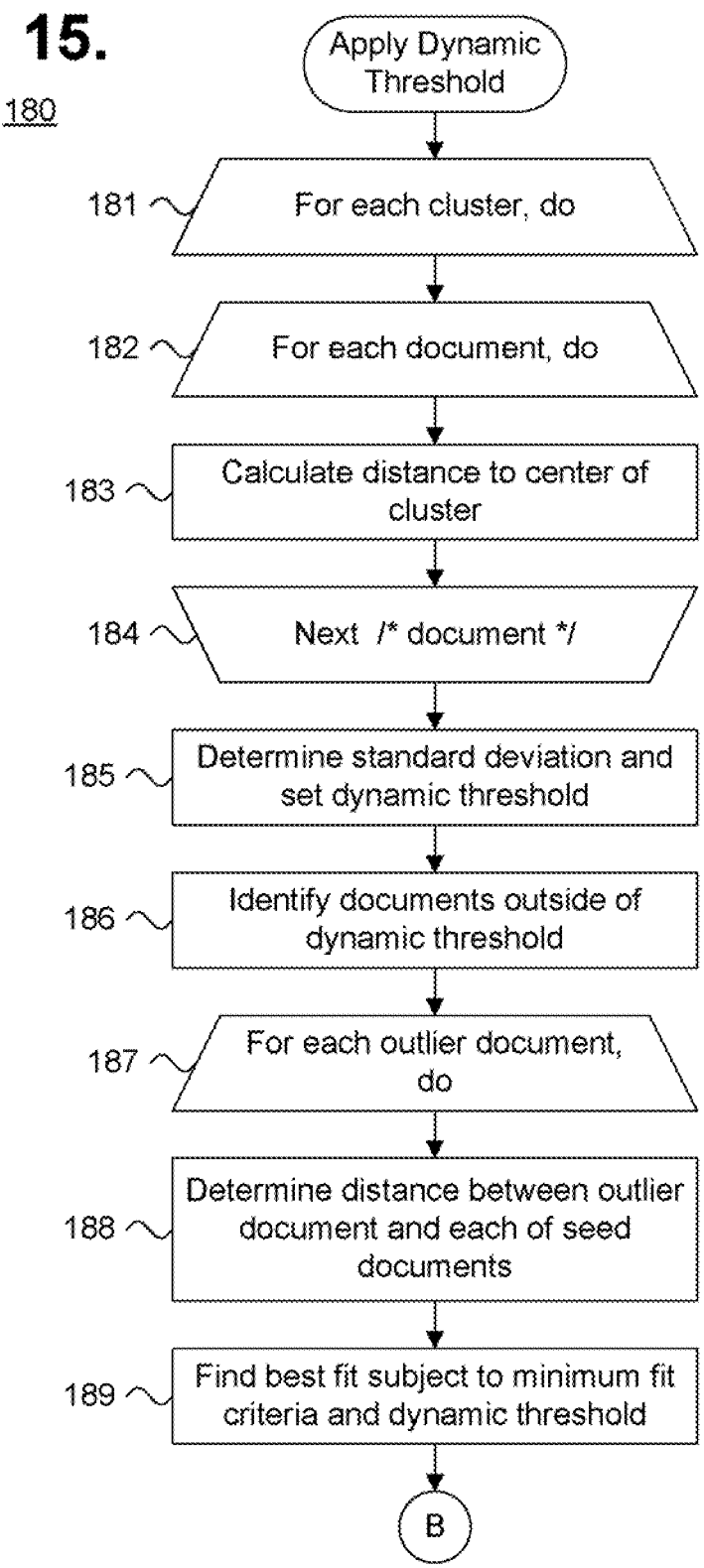

SYSTEM AND METHOD FOR SCORING CONCEPTS IN A DOCUMENT SET

CROSS-REFERENCE TO RELATED APPLICATION

This patent application is a continuation of U.S. patent application Ser. No. 10/626,984, filed Jul. 25, 2003 now U.S. Pat. No. 7,610,313, issued on Oct. 27, 2009, the priority date of which is claimed and the disclosure of which is incorporated by reference.

FIELD

The present invention relates in general to concept and term scoring and clustering and, in particular, to a system and method for scoring concepts in a document set.

BACKGROUND

Large collections of documents have become increasingly available in electronically stored form due, in part, to the widespread adoption of computer-automated information and decision support systems. At the same time, electronically stored document collections have increasingly complemented and often supplanted traditional forms of printed communications. Electronically stored documents present several significant advantages over traditional printed formats, including efficient storage, rapid searchability, and facilitating immediate communication and publication over networking means, including the Internet.

From a pragmatic standpoint, the availability of electronically stored document collections has presented both a treasure and a curse to those seeking information discovery and retrieval. These types of document collections have expanded to include various forms of information classes, such as word processing documents, electronic mail, Worldwide Web (or simply "Web") pages, spreadsheets, databases, and the like. And although now available in a highly searchable format, information embedded in documents stored in an electronic format must generally still be "mined" at a semantic level to discover and retrieve the data contained within. Mining out the semantic content of a document collection is essential to certain fields of endeavor, such as during the discovery phase of litigation. However, efficiently discovering and extracting such embedded semantic information can be an intractable problem, particularly when the size of the collection of documents is large.

Text mining is at the core of the information discovery process, and is described in D. Sullivan, "Document Warehousing and Text Mining, Techniques for Improving Business Operations, Marketing, and Sales," Chs. 1-3, Wiley Computer Publishing (2001), the disclosure of which is incorporated by reference. Text mining involves the compiling, organizing and analyzing of document collections to support identification of types of information contained in the documents and to discover relationships between relevant facts. However, identifying relevant information can be difficult. First, extracting relevant content requires a high degree of precision and recall. Precision is the measure of how well the documents returned in response to a query actually address the query criteria. Recall is the measure of what should have been returned by the query. Typically, the broader and less structured the documents, the lower the degree of precision and recall. Second, analyzing an unstructured document collection without the benefit of a priori knowledge in the form of keywords and indices can present a potentially intractable problem space. Finally, synonymy and polysemy can cloud and confuse extracted content. Synonymy refers to multiple words having the same meaning and polysemy refers to a single word with multiple meanings. Fine-grained text mining must reconcile synonymy and polysemy to yield meaningful results.

Text mining is a significant first step in the overall process of discovering semantic meanings within a document collection. A further problem involves classifying the documents within a collection with respect to ad hoc categories of interest. For instance, during the discovery phase of litigation, documents must often be categorized into distinct groups, such as "relevant," "non-relevant," and "privileged." Generally, the various documents falling into each group share certain characteristics, which can often be expressed as concepts and terms.

Similarly, categorizing the documents themselves into groups of related documents may be necessary as an aid to post-text mining document analysis. Text mining creates a multi-dimensional problem space that can be difficult to intuitively comprehend based on the presence of concepts and terms within the document collection overlapping by various degrees. Data visualization tools are available to display groups or "clusters" of documents, such as described in commonly-assigned U.S. Pat. No. 6,888,548, issued May 3, 2005, and U.S. Pat. No. 6,778,995, issued Aug. 17, 2004, and U.S. Pat. No. 7,271,804, issued Sep. 18, 2007, pending, the disclosures of which are incorporated by reference. Data visualization tools enable a user to rapidly comprehend and pare down the potential search field within a document collection, based on extracted concepts and terms.

In the prior art, text mining is performed in two ways. First, syntactic searching provides a brute force approach to analyzing and extracting content based on literal textual attributes found in each document. Syntactic searching includes keyword and proximate keyword searching as well as rule-based searching through Boolean relationships. Syntactic searching relies on predefined indices of keywords and stop words to locate relevant information. However, there are several ways to express any given concept. Accordingly, syntactic searching can fail to yield satisfactory results due to incomplete indices and poorly structured search criteria.

A more advanced prior art approach uses a vector space model to search for underlying meanings in a document collection. The vector space model employs a geometric representation of documents using word vectors. Individual keywords are mapped into vectors in multi-dimensional space along axes representative of query search terms. Significant terms are assigned a relative weight and semantic content is extracted based on threshold filters. Although substantially overcoming the shortcomings of syntactic searching, the multivariant and multidimensional nature of the vector space model can lead to a computationally intractable problem space. As well, the vector space model fails to resolve the problems of synonymy and polysemy.

Therefore, there is a need for an approach to identifying semantic information within a document collection based on extracted concepts and terms. Preferably, such an approach would assign a score to each concept and term based on the inherent characteristics of each document and the overall document set.

There is a further need for an approach to clustering documents within a document collection with respect to similarities reflected by the scores assigned to the concepts and terms.

Preferably, such an approach would accept a set of candidate seed documents for evaluation and initial clustering.

SUMMARY

The present invention provides a system and method for scoring and clustering documents based on extracted concepts and terms. Canonical concepts are formed from concepts and terms extracted from a set of documents and the frequencies of occurrences and reference counts of the concepts and terms are determined. Each concept and term is then scored based on frequency, concept weight, structural weight, and corpus weight. The scores are compressed and assigned to normalized score vectors for each of the documents. A similarity between each normalized score vector is determined, preferably as a cosine value. A set of candidate seed documents is evaluated to select a set of seed documents as initial cluster centers based on relative similarity between the assigned normalized score vectors for each of the candidate seed documents. The remaining non-seed documents are evaluated against the cluster centers also based on relative similarity and are grouped into clusters based oil a best fit, subject to a minimum fit criterion.

An embodiment provides a system and method for scoring concepts in a document set. A set of documents is maintained. Concepts including two or more terms extracted from the document set are identified. Each document having one or more of the concepts is designated as a candidate seed document. A score is calculated for each of the concepts identified within each candidate seed document based on a frequency of occurrence, concept weight, structural weight, and corpus weight. A vector is formed for each candidate seed document including the concepts located in that candidate seed document and the associated concept scores. The vector for each candidate seed document is compared with a center of one or more clusters each having thematically-related documents. At least one of the candidate seed documents that is sufficiently distinct from the other candidate seed documents is selected as a seed document for a new cluster. Each of the unselected candidate seed documents is placed into one of the clusters having a most similar cluster center.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a data flow diagram showing the stages of document scoring performed by the document analyzer of FIG. 1.

FIG. 4 is a data flow diagram showing the stages of document clustering performed by the document analyzer of FIG. 1.

FIG. 5 is a flow diagram showing a method for performing efficient document scoring and clustering, in accordance with the present invention.

FIG. 7 is a data structure diagram showing a schema for a document record maintained in the database of FIG. 1.

FIG. 8 is a data structure diagram showing a schema for a concept record maintained in the database of FIG. 1.

FIG. 9 is a data structure diagram showing a schema for an associated concept record maintained in the database of FIG. 1.

DETAILED DESCRIPTION

Glossary

Keyword: A literal search term, which is either present or absent from a document. Keywords are not used in the evaluation of documents as described herein.

Term: A normalized root stem of a single word appearing in the body of at least one phrase.

Phrase: Two or more words co-occurring in the body of a document.

Concept: A collection of terms or phrases defining a specific meaning.

Theme: Two or more concepts defining a semantic meaning.

Cluster: Documents identified to contain a common theme.

The foregoing terms are used throughout this document and, unless indicated otherwise, are assigned the meanings presented above.

System Overview

Figure 1:
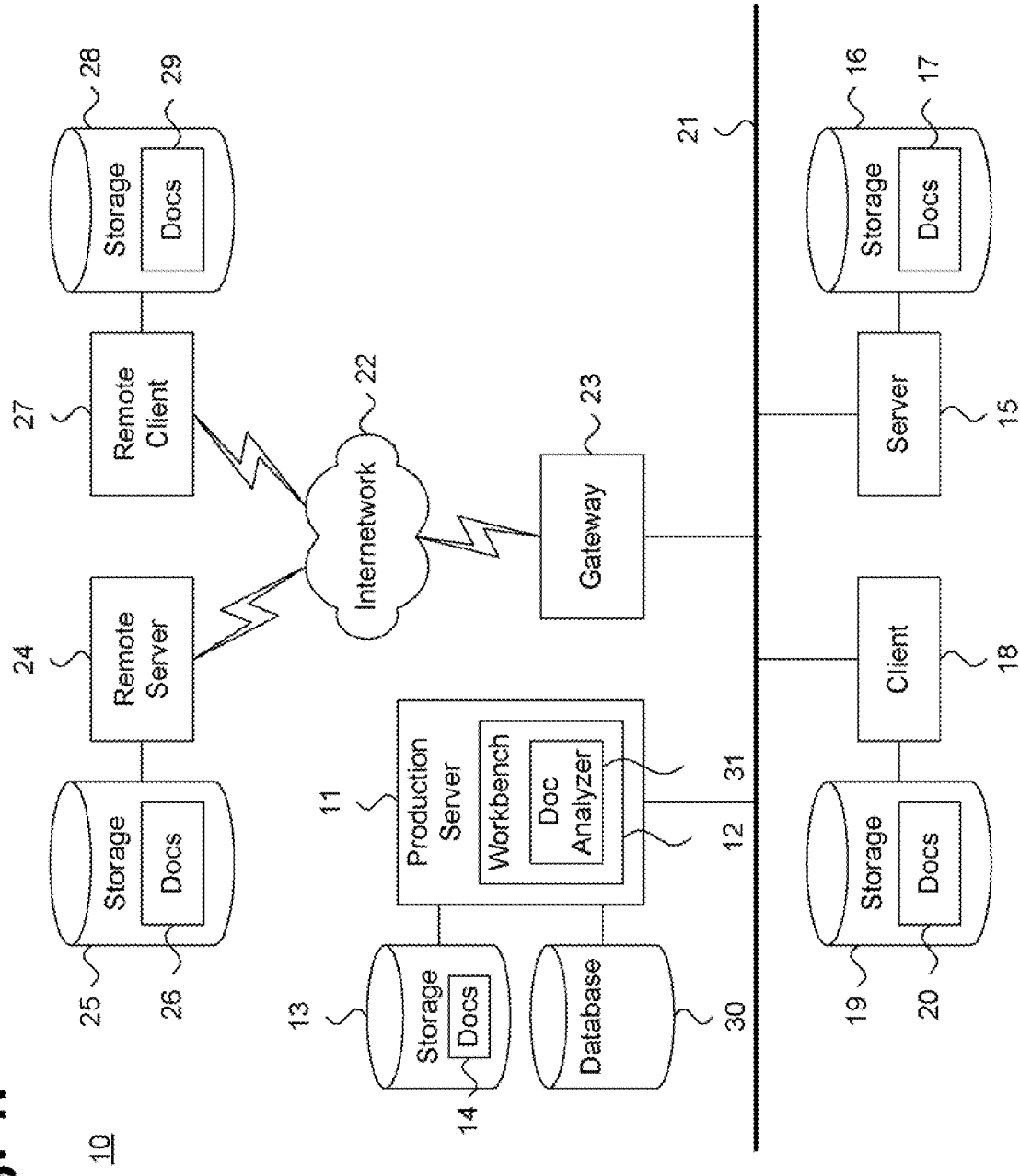
FIG. 1 is a block diagram showing a system for performing efficient document scoring and clustering, in accordance with the present invention.

FIG. 1 is a block diagram showing a system 10 for performing efficient document scoring and clustering, in accordance with the present invention. By way of illustration, the system 10 operates in a distributed computing environment, which includes a plurality of heterogeneous systems and document sources. The system 10 includes a production server 11, which executes a workbench application 15 for providing a framework for acquiring, logging, culling, and preparing documents for automated review and analysis. The workbench application 15 includes a document analyzer 31 for performing efficient document scoring and clustering, as further described below with reference to FIG. 2. The production system 11 is coupled to a storage device 13, which stores documents 14, in the form of structured or unstructured data, and a database 30 for maintaining document information.

The document analyzer 31 analyzes documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the production system 11 over an intranetwork 21. In addition, the document analyzer 31 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of structured and unstructured data, including electronic message stores, such as word processing documents, electronic mail (email) folders, Web pages, and graphical or multimedia data. Notwithstanding, the documents could be in the form of organized data, such as stored in a spreadsheet or database.

In the described embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including production system 11, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Document Analyzer

Figure 2:
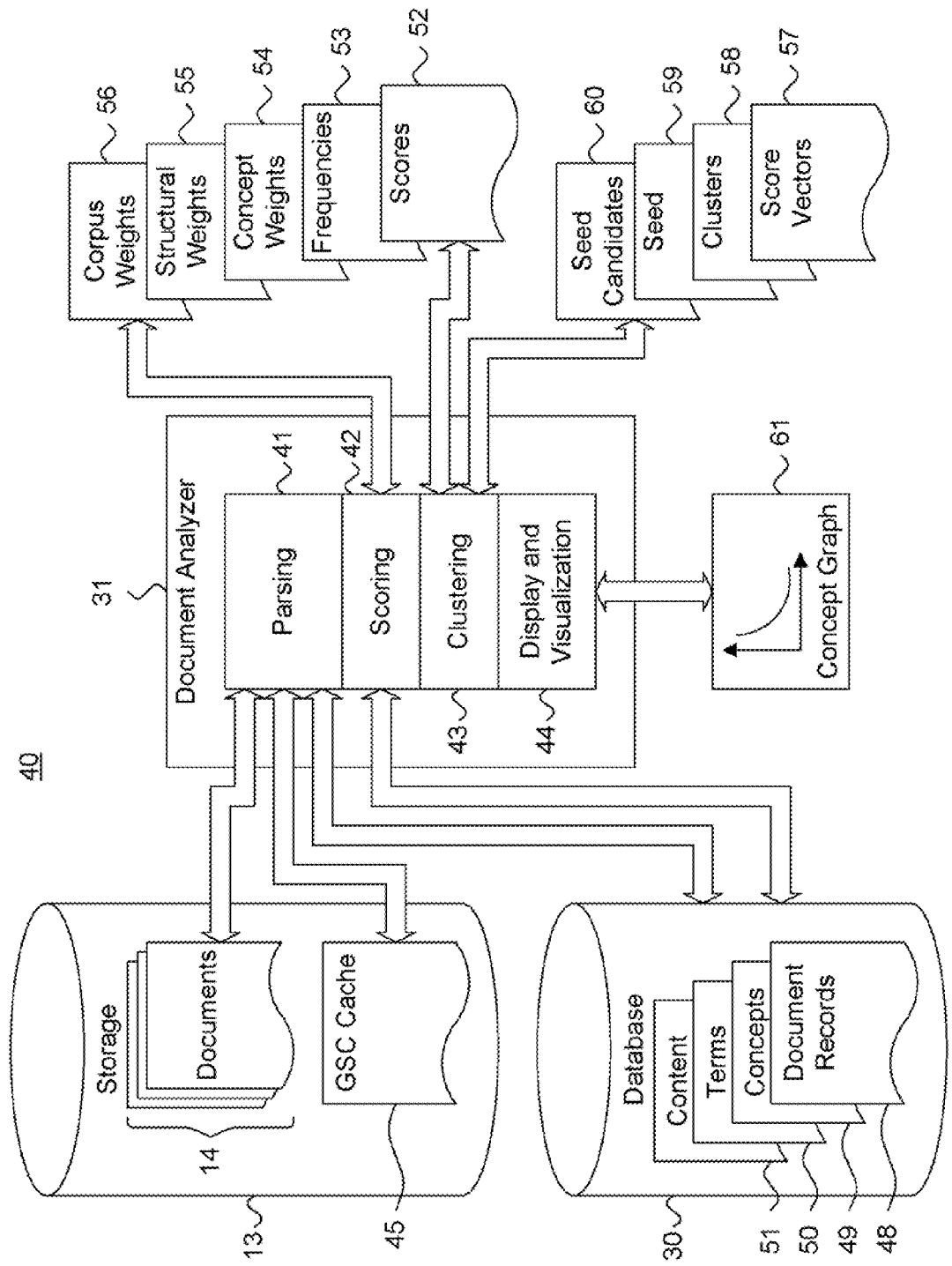
FIG. 2 is a block diagram showing the system modules implementing the document analyzer of FIG. 1.

FIG. 2 is a block diagram showing the system modules 40 implementing the document analyzer 31 of FIG. 1. The document analyzer 31 includes four modules: parsing 41, scoring 42, clustering 43, and display and visualization 44. The parsing module 41 processes documents 14 retrieved from the storage device 13 into document records 48, concept records 49, term records 50, and content records 51, which are maintained in the database 30, as further described below with reference to FIG. 6. The parsing module 41 optionally utilizes a global stop concept (GSC) cache 45 to selectively filter out global concepts.

The scoring module 42 generates scores 52 for each of the concepts and terms, based on frequencies 53, concept weights 54, structural weights 55, and corpus weights 56, as further described below with reference to FIG. 11. Briefly, the frequencies 53 indicate the number of occurrences of a given concept or term within a document 14. The concept weight 54 provides the specificity of the meaning of a concept or term. The structural weight 55 assigns a degree of significance to the concept or term. The corpus weight 56 inversely weighs the reference count, that is, the number of documents containing a concept or term at least once. Each score 52 is logarithmically compressed to provide a better linear vector representation and the scores are formed into normalized score vectors 57 for each of the documents 14.

The clustering module 43 forms clusters 58 of the documents 14 using the similarities of concepts and terms between the normalized score vectors 57, as further described below with reference to FIG. 14. As a preparatory step in forming clusters 58, the clustering module 43 iteratively analyzes a set of seed candidate documents 60 to form a set of seed documents 59 from which the clusters 58 are generated.

The display and visualization module 44 complements the operations performed by the document analyzer 31 by presenting visual representations of the information extracted from the documents 14. The display and visualization module 44 generates a concept graph 61 of concept references determined over all documents 14, as further described below with reference to FIG. 13.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The document analyzer 31 operates in accordance with a sequence of process steps, as further described below with reference to FIG. 5.

Document Scoring

FIG. 3 is a data flow diagram 65 showing the stages of document scoring performed by the document analyzer 14 of FIG. 1. Document records 48 are preprocessed and noun phrases are extracted as concepts 65 and terms 66 for storage in concept records 49 and term records 50, respectively (transition 66). The concepts 65 and terms 66 are cataloged into content records 51 (transmission 67). A score 52 is then generated based on the frequencies 53, concept weights 54, structural weights 55, and corpus weights 56 of each concept 65 and term 66 (transitions 68-72). Optionally, a concept graph 61 can be generated (transition 73).

Document Clustering

FIG. 4 is a data flow diagram showing the stages 75 of document clustering performed by the document analyzer 14 of FIG. 1. Candidate seed documents 60 are selected to identify those documents 14 containing concepts 49 and, if necessary, terms 50, which represent categories of subject matter for potential clusters 52. The candidate seed documents 60 are evaluated (transition 76) based on similarity to a set of cluster centers 58, as measured by cosine values between normalized score vectors 57. Non-seed documents 78, that is, each of the documents 14 not selected as a seed document 60, are evaluated (transition 77) based on similarity to the set of cluster centers 58. Those non-seed documents 78 meeting a best fit criterion, subject to a minimum fit criterion, are formed (transition 79) into clusters 58.

Method Overview

FIG. 5 is a flow diagram showing a method 80 for performing efficient document scoring and clustering, in accordance with the present invention. The method 80 is described as a sequence of process operations or steps, which can be executed, for instance, by a document analyzer 31 (shown in FIG. 1).

As a preliminary step, the set of documents 14 to be analyzed is preprocessed (block 81) to identify terms and to extract concepts 65 and terms 66, as further described below with reference to FIG. 6. Once preprocessed, the concepts 65 and terms 66 from the documents 14 are scored (block 82), as further described below with reference to FIG. 11, and formed into clusters 58 (block 83), as further described below with reference to FIG. 14. Optionally, the concept references can be displayed and visualized as a concept graph 61 (block 84), as further described below with reference to FIG. 13. The routine then terminates.

Document Parsing

Figure 6:
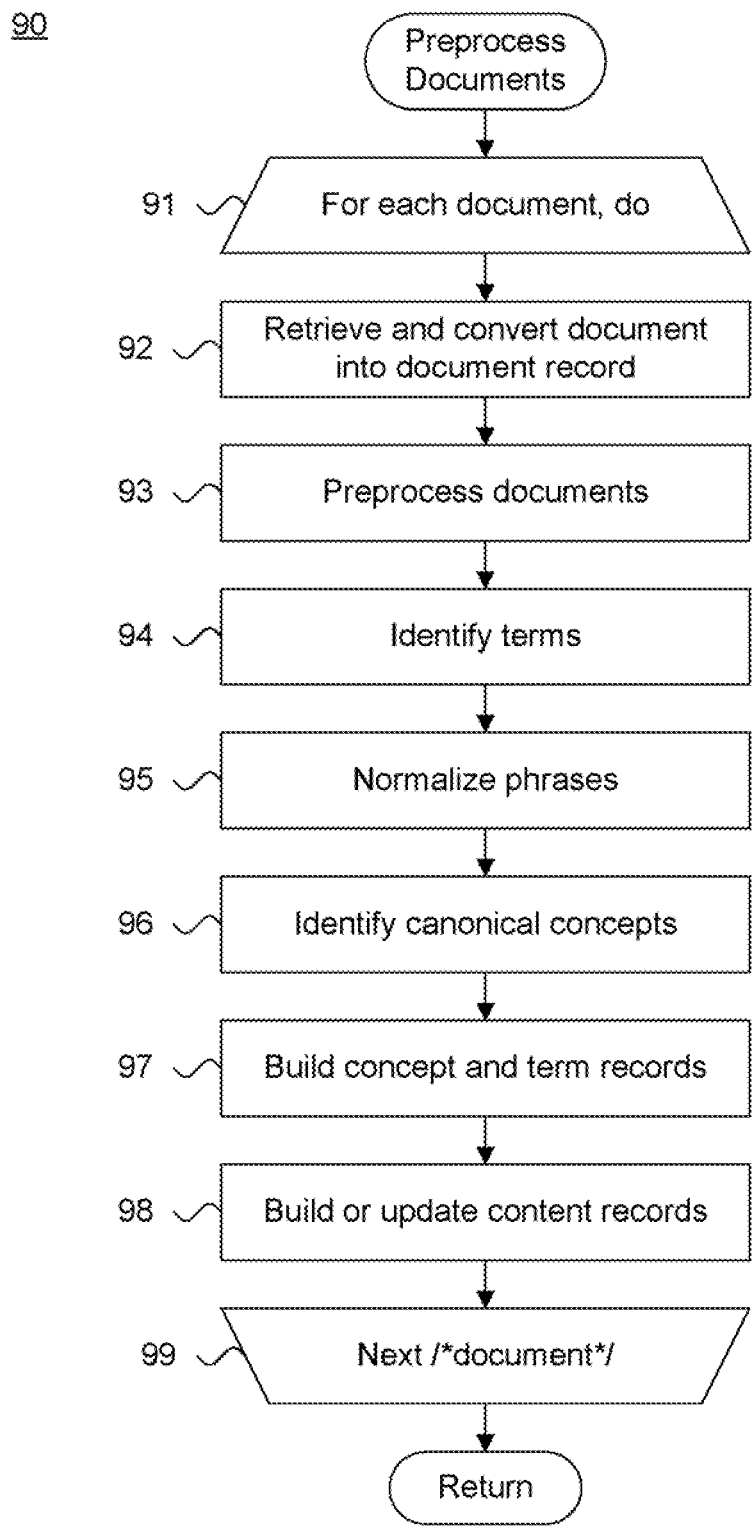
FIG. 6 is a flow diagram showing the routine for performing document parsing for use in the method of FIG. 5.

FIG. 6 is a flow diagram showing the routine 90 for performing document parsing for use in the method 80 of FIG. 5.

The purpose of this routine is to retrieve a set of documents 14 from the storage device 13, identify terms occurring in each of the documents 14, and extract concepts 65 and terms 66 in the form of noun phrases for storage as concept records 49 and term records 50 in the database 30.

The set of documents 14 maintained in the storage device 13 is processed in an iterative processing loop (blocks 91-99). During each iteration (block 91), each document 14 is retrieved from the storage device 13 and converted into a document record 48 (block 92) maintained in the database 30, as further described below with reference to FIG. 7. The process of converting a document 14 into a document record 48 includes parsing through each document structure, that is, structural location, and creating a standardized representation of the document 14 to enable efficient, application-independent processing of the contents of each document 14.

Preliminarily, each document 14 may be preprocessed (block 93) to remove extraneous formatting characters, such as hard returns or angle brackets, often used to embed previous email messages. Preprocessing maximizes syntactical extraction of desired terms and phrases without altering any semantic contents.

The global stop concept cache 45 contains a set of globally-applicable stop concepts used to suppress generic terms, such as "late," "more," "good," or any user-defined stop concepts, which are suppressed to emphasize other important concepts in specific review contexts. In the described embodiment, the global stop concept cache 45 is generated dynamically after document analysis as document review progresses. Other forms of term and concept exclusion could be provided, as would be recognized by one skilled in the art.

Next, terms within the documents 14 are identified (block 94). Terms are defined on the basis of extracted noun phrases, although individual nouns or tri-grams (word triples) could be used in lieu of noun phrases. In the described embodiment, the noun phrases are extracted using the LinguistX product licensed by Inxight Software, Inc., Santa Clara, Calif. The identified phrases consist of regular nouns, as well as proper nouns or adjectives.

Next, the phrases are normalized (block 95) and used to identify canonical concepts (block 96). Unless indicated otherwise, the term "concepts" refers to canonical concepts as stored in a concept record 49 and applies equally to both concepts 65 and terms 66. Canonical concepts include the concepts 65 and terms 66 preferably processed into word stem form. In addition, the individual terms 66 comprising each concept 65 are converted to uniform lower case type and are alphabetized. By way of example, the sentence, "I went to the Schools of Business," would yield the canonical concept "business, school." Similarly, the sentence, "He went to Business School," would yield the same canonical concept "business, school." Other forms of canonical concepts could be used, including alternate word forms and arrangements, as would be recognized by one skilled in the art.

The canonical concepts are then used to build concept records 49 and term records 50 (block 97), as further described below with reference to FIG. 8. Finally, content records 51 for each concept occurrence are built or updated (block 98), as further described below with reference to FIG. 10. Processing continues with the next document 14 (block 99), after which the routine returns.

Document Record Schema

FIG. 7 is a data structure diagram showing a schema 100 for a document record 101 maintained in the database 30 of FIG. 1. One document record 101 is maintained per document 14. Each document record 101 uniquely identifies the associated document 14 and stores the contents of the message 14, preferably including any formatting and layout information, in a standardized representation. Each document record 101 includes fields for storing a document identifier (Doc ID) 102 and document name (Doc Name) 103.

Concept Record Schema

FIG. 8 is a data structure diagram showing a schema 110 for a concept record 111 maintained in the database 30 of FIG. 1. One concept record 111 is maintained per canonical concept. A canonical concept can include both concepts 65 and terms 66 arranged in alphabetized, normalized form. Each concept record 111 includes fields for storing a unique concept identifier (Concept ID) 112 and concept 113.

Associated Concept Record Schema

FIG. 9 is a data structure diagram showing a schema 115 for an associated concept record 116 maintained in the database 30 of FIG. 1. Concepts 65 consisting of more than one term 66 have associated records 116 stored as pairs of concept identifiers (Concept ID) 117 and term identifiers (Term ID) 118.

Content Record Schema

Figures 10, 11:
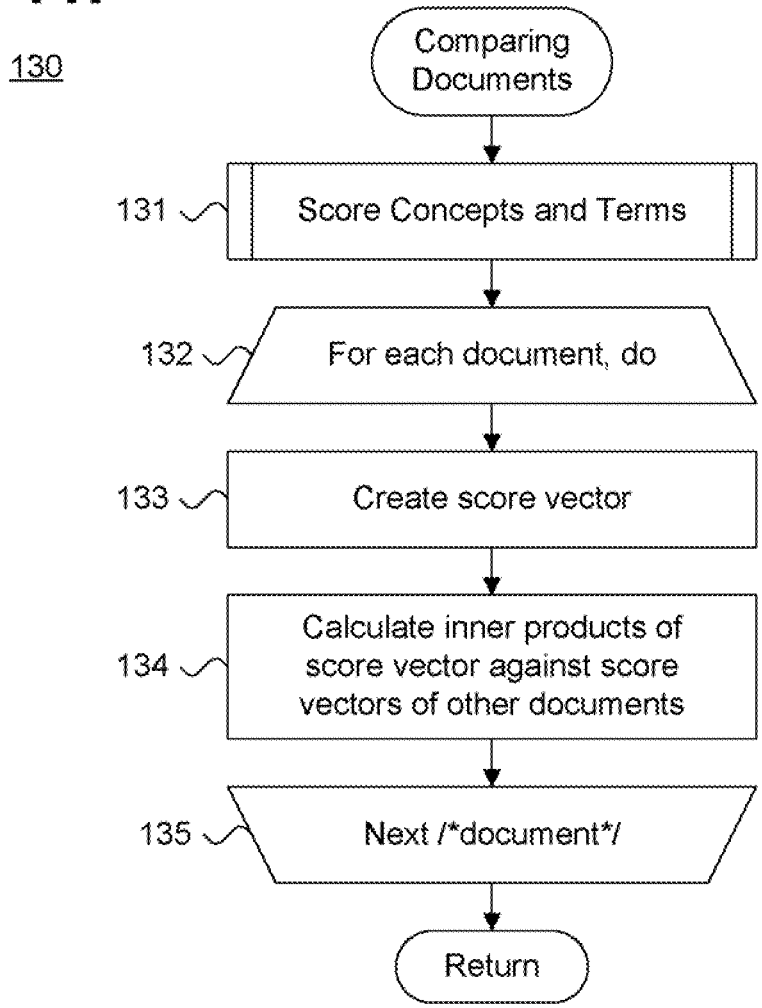
FIG. 10 is a data structure diagram showing a schema for a content record maintained in the database of FIG. 1.
FIG. 11 is a flow diagram showing a routine for comparing documents for use in the method of FIG. 5.

FIG. 10 is a data structure diagram showing a schema 120 for a content record 121 maintained in the database 30 of FIG. 1. One content record 121 is maintained per concept occurrence per structure per document 14. In addition, additional content records 121 can be maintained per additional concept occurrences per document 14. Thus, one document 14 could have an associated set of one or more content records 121 for each concept 65 or term 66 identified within the document 14. Similarly, one document 14 could have several associated sets of one or more content records 121 where, for instance, the concept 65 or term 66 appears in structurally distinct sections of the document 14, such as in the subject, title or body of a document. Each content record 121 includes fields for storing a document identifier (Doc ID) 122, concept identifier (Concept ID) 123, frequency 124, and structure code 125. The frequency 124 records the number of times that the concept 65 or term 66 is referenced within the document 14. The structure code 125 indicates the structural location within the document 14 from which the concept was extracted.

Document Scoring Routine

FIG. 11 is a flow diagram showing a routine 130 for comparing documents 14 for use in the method 80 of FIG. 5. The purpose of this routine is to create a normalized score vector 57 for each document 14 and calculate a similarity metric between each of the normalized score vectors 57.

As an initial step, each concept 56 and term 66 is individually scored (block 131), as further described below with reference to FIG. 12. Next, a normalized score vector 57 is created for each document 14 in an iterative processing loop (block 132-136). One document 14 is processed per iteration (block 132) by first creating the normalized score vector 57 (block 133). Each normalized score vector 57 includes a set of paired values, consisting of a concept identifier 112 for each concept 65 and term 66 occurring in that document 14 and the scores 52 for that concept 65 or term 66. Preferably, the paired values are ordered. In the described embodiment, only non-zero scores are maintained for efficiency.

For example, assume a normalized score vector 57 for a first document A is $\vec{S}_A = \{(5, 0.5), (120, 0.75)\}$ and a normalized score vector 57 for another document B is $\vec{S}_B = \{(3, 0.4), (5, 0.75), (47, 0.15)\}$. Document A has scores corresponding to concepts '5' and '120' and Document B has scores corresponding to concepts '3,' '5' and '47.' Thus, these documents only have concept '5' in common.

An inner product of the normalized score vector 57 for the current document 14 is calculated against the normalized score vectors 57 of each other document 14 among corresponding dimensions (block 134) by iterating through the paired values in the normalized score vector 57 to identify commonly occurring concepts 65 and terms 66. Cosine cos σ is equivalent to the inner products between two normalized vectors. The cosine cos σ provides a measure of relative similarity or dissimilarity between the concepts 65 and terms 66 occurring in each document 14 and can therefore serve as a form of similarity metric, as would be recognized by one skilled in the art. In the described embodiment, the cosine cos σ is calculated in accordance with the equation:

$$\cos\sigma_{AB} = \frac{\langle \vec{S}_A \cdot \vec{S}_B \rangle}{|\vec{S}_A||\vec{S}_B|}$$

where $\cos\sigma_{AB}$ comprises the similarity for between the document A and the document B, $\vec{S}_A$ comprises a score vector 57 for document A, and $\vec{S}_B$ comprises a score vector 57 for document B. Other forms of determining a relative similarity metric are feasible, as would be recognized by one skilled in the art. Processing continues with the next document 14 (block 135), after which the routine returns.

Concept and Term Scoring Routine

Figure 12:
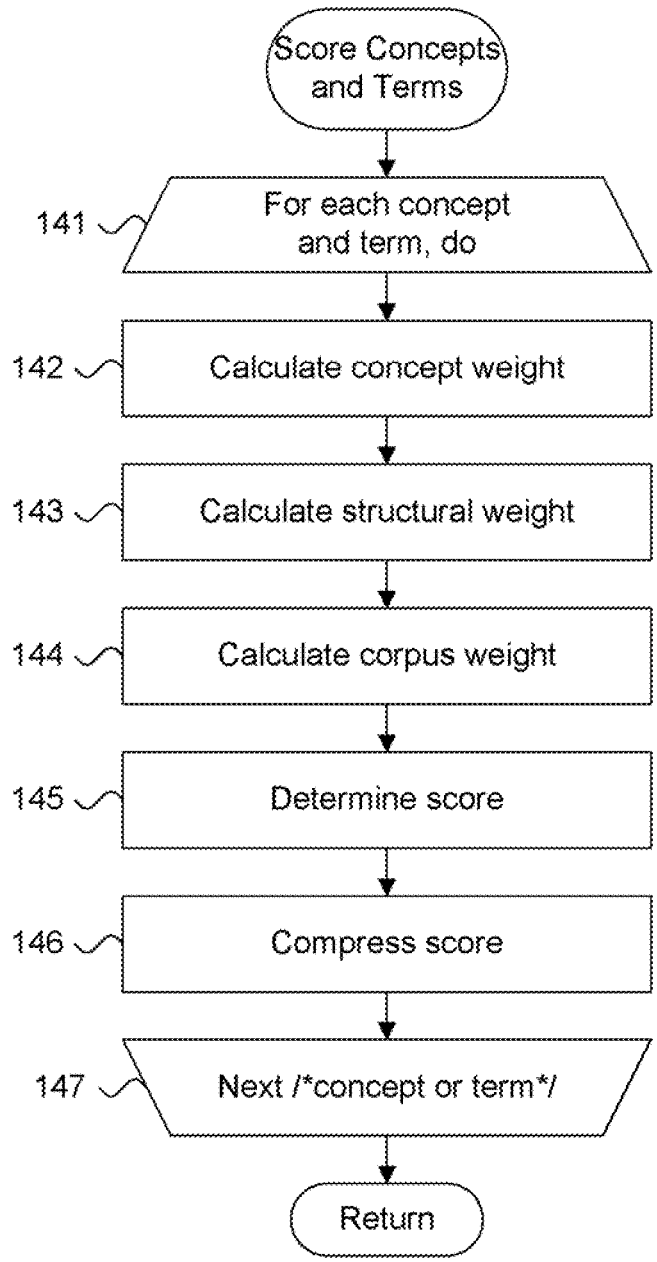
FIG. 12 is a flow diagram showing a routine for scoring concepts and terms for use in the routine of FIG. 11.

FIG. 12 is a flow diagram showing a routine 140 for scoring concepts 65 and terms 66 for use in the routine 130 of FIG. 11. The purpose of this routine is to evaluate a score 52 for each concept 65 and term 66 based on frequency 53, concept weight 54, structural weight 55, and corpus weight 56. Each evaluated score 52 is compressed to enable better linear vector representation of those documents 14 which include lengthy contents.

A score 52 is calculated for each concept 65 and term 66 in an iterative processing loop (block 141-147). During each iteration (block 141), a score 52 is calculated as follows. First, a concept weight 54 is determined for the concept 65 or term 66 (block 142). The concept weight 54 reflects the specificity of the meaning of a single concept 65 or term 66.

In the described embodiment, each concept weight 54 is based on the number of individual terms 66 that make up the concept 65 or term 66. Each concept weight 54 is calculated in accordance with the following equation:

$$cw_{ij} = \begin{cases} 0.25 + (0.25 \times t_{ij}), & 1 \le t_{ij} \le 3 \\ 0.25 + (0.25 \times [7 - t_{ij}]), & 4 \le t_{ij} \le 6 \\ 0.25, & t_{ij} \ge 7 \end{cases}$$

where $cw_{ij}$ comprises the concept weight and $t_{ij}$ comprises a number of terms for occurrence j of each such concept i. The specificity of the meaning of a single concept 65 increases as the number of terms 66 occurring in the concept 65 increases. Intuitively, three to four terms 66 per concept 65 have proven more useful than other numbers of terms for differentiating between documents 14. Conversely, long concepts having in excess of five or more terms 66 tend to reflect parsing errors or are too specific for effective clustering.

Next, a structural weight 55 is determined for the concept 65 or term 66 (block 143). Each structural weight 55 reflects a varying degree of significance assigned to the concept 65 or term 66 based on structural location within the document 14. For example, subject lines in electronic mail (email) messages are assigned more importance than signature blocks.

In the described embodiment, each structural weight 55 is determined in accordance with the equation:

$$sw_{ij} = \begin{cases} 1.0, & \text{if } (j \approx \text{SUBJECT}) \\ 0.8, & \text{if } (j \approx \text{HEADING}) \\ 0.7, & \text{if } (j \approx \text{SUMMARY}) \\ 0.5, & \text{if } (j \approx \text{BODY}) \\ 0.1, & \text{if } (j \approx \text{SIGNATURE}) \end{cases}$$

where $sw_{ij}$ comprises the structural weight for occurrence j of each such concept i. Other assignments of structural weight based on the location or arrangement of a concept 65 or term 66 occurrence within a document 14 are feasible, as would be recognized by one skilled in the art.

Next, a corpus weight is determined for the concept 65 or term 66 (block 144). The corpus weight 56 inversely weighs the reference count of the occurrences of each concept 65 or term 66 within a given document 14. The overall goal of forming clusters 58 is to group those documents 14 having similar content. Accordingly, the reference count of each concept 65 and term 66 can be used to differentiate document similarities. However, frequently referenced concepts 65 and terms 66 can dilute the differentiating measure of the reference counts and are ineffective in grouping similar documents. The reference counts for infrequently referenced concepts 65 and terms 66 also lack appreciable meaning as a differentiating measure except when evaluating clusters 58 for a small document set.

In the described embodiment, each corpus weight 56 is determined in accordance with the equation:

$$rw_{ij} = \begin{cases} \left(\frac{T - r_{ij}}{T}\right)^2, & r_{ij} > M \\ 1.0, & r_{ij} \le M \end{cases}$$

where $rw_{ij}$ comprises the corpus weight, $r_{ij}$ comprises a reference count for occurrence j of each such concept i, T comprises a total number of reference counts of documents in the document set, and M comprises a maximum reference count of documents in the document set. A value of 10% is used to indicate the maximum reference count at which a score contribution is discounted, although other limits could be used, as would be recognized by one skilled in the art.

Next, the actual score 52 for each concept 65 and term 66 is determined (block 145). Note each concept 65 and term 66 could occur one or more times within the same document 14 and could be assigned different structural weights 55 based on structural locations within the document 14. Each score 52 represents the relative weight afforded to each concept 65 and term 66 with respect to a particular document 14.

In the described embodiment, each score 52 is calculated in accordance with the equation:

$$S_i = \sum_{1 \to n}^{j} f_{ij} \times cw_{ij} \times sw_{ij} \times rw_{ij}$$

where $S_i$ comprises the score 52, $f_{ij}$ comprises the frequency 53, $0 \le cw_{ij} \le 1$ comprises the concept weight 54, $0 < sw_{ij} \le 1$ comprises the structural weight 55, and $0 < rw_{ij} \le 1$ comprises the corpus weight 56 for occurrence j of concept i within a given document 14. Finally, the score 52 is compressed (block 146) to minimize the skewing caused by concepts 65 and terms 66 occurring too frequently.

In the described embodiment, each compressed score is determined in accordance with the equation:

$$S_i' = \log(S_i + 1)$$

where $S_i'$ comprises the compressed score 52 for each such concept i. Logarithmical compression provides effective linear vector representation of those documents 14 having a large body of content. Other forms of score compression could be used, as would be recognized by one skilled in the art.

Processing continues with the next concept 65 or term 66 (block 147), after which the routine returns.

Concept Reference Frequencies Graph

Figure 13:
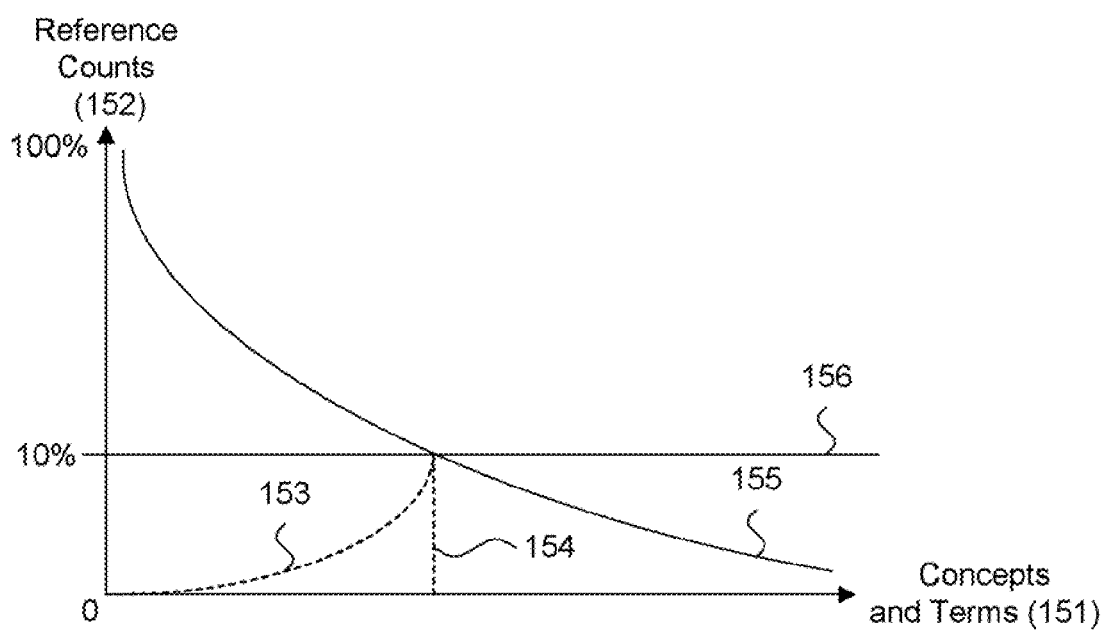
FIG. 13 is a graph showing, by way of example, the frequency of concept references.

FIG. 13 is a graph 150 showing, by way of example, the frequency of concept references. The graph 150 illustrates the effect of inversely weighing the reference counts of concepts 65 and terms 66. The x-axis represents the individual concepts 65 and terms 66 occurring in the set of documents 14. The y-axis indicates the reference counts 152, that is, the number of documents 14 containing a given concept 65 or term 66. A curve 155 reflects the ratio of concepts and terms versus reference counts. Accordingly, the concepts 65 and terms 66 appearing in at least 10% of the documents are discounted as lacking sufficient differentiating characteristics. A line 156 reflects the 10% cutoff point and the curve 153 reflects the corpus weight 56 of each of the concepts 65 and terms 66, up to the 10% cutoff point 154.

Cluster Forming Routine

Figure 14:
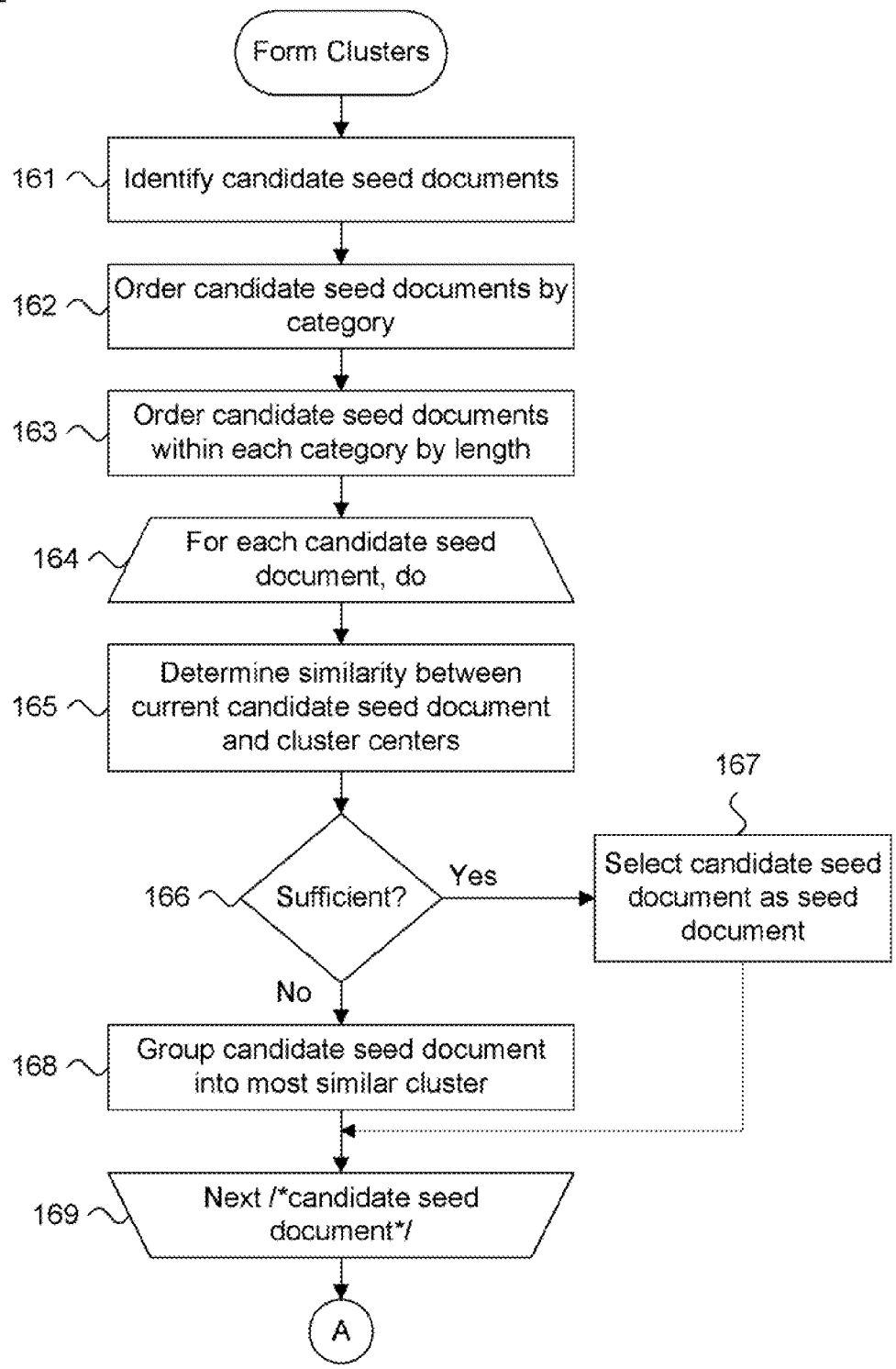
FIG. 14 is a flow diagram showing a routine for forming clusters for use in the method of FIG. 5.
Figure 14:
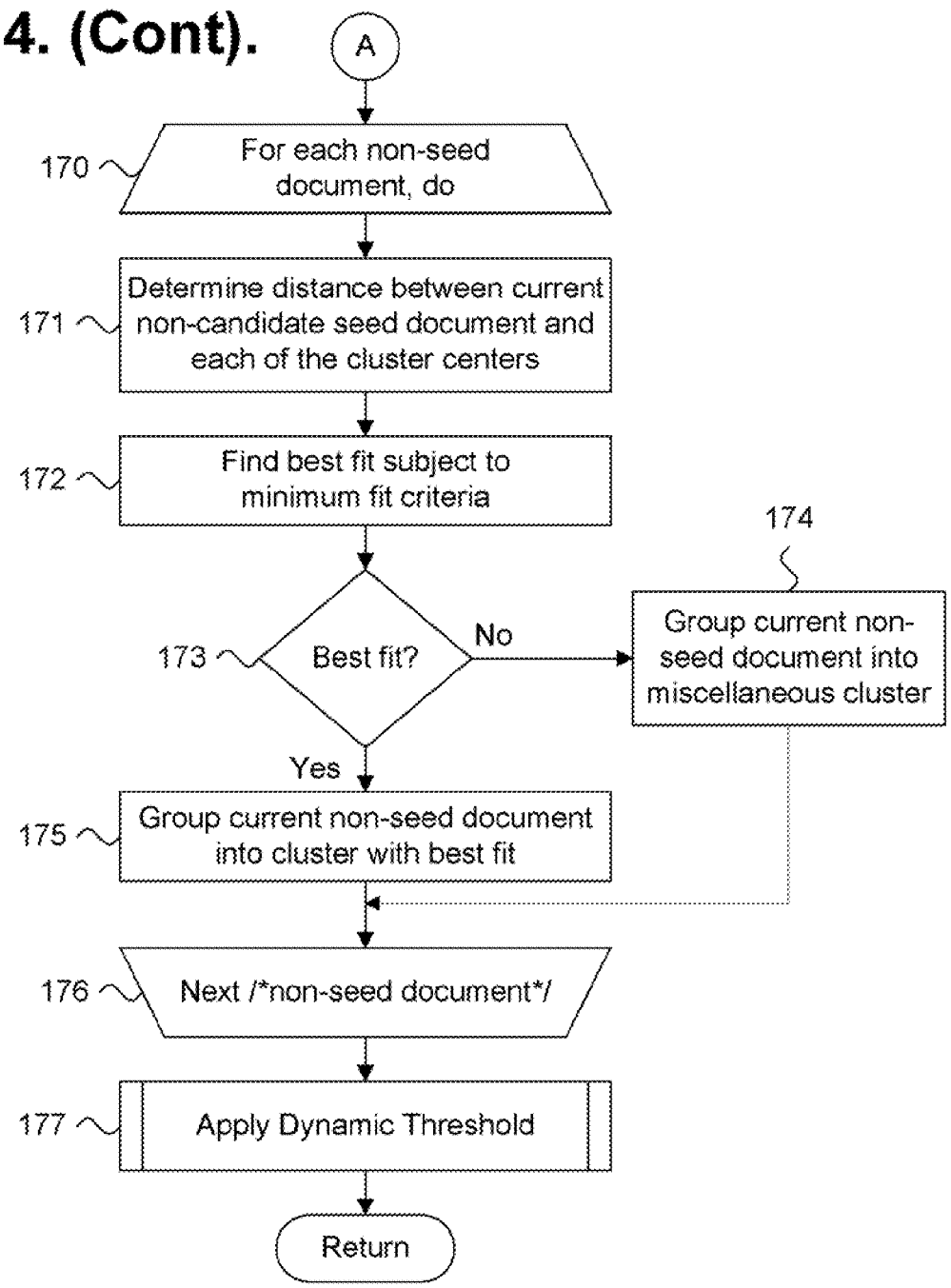

FIG. 14 is a flow diagram showing a routine 160 for forming clusters 58 for use in the method 80 of FIG. 5. The purpose of this routine is to use the scores 52 of the concepts 65 and terms 66 as stored into the normalized score vectors 57 to form clusters 58 of documents 14 based on relative similarity.

The routine proceeds in two phases. During the first phase (blocks 161-169), seed candidate documents 60 are evaluated to identify a set of seed documents 59. During the second phase (blocks 170-176), non-seed documents 78 are evaluated and grouped into clusters 58 based on a best-fit criterion.

First, candidate seed documents 60 are identified (block 161) and ordered by category (block 162). In the described embodiment, the candidate seed documents 60 are selected based on a subjective evaluation of the documents 14 and are assigned into generalized categories, such as "responsive," "non-responsive," or "privileged." Other forms of classification and categorization are feasible, as would be recognized by one skilled in the art.

Next, the candidate seed documents 60 are ordered within each category based on length (block 163). Each candidate seed document 60 is then processed in an iterative processing loop (blocks 164-169) as follows. The similarity between each current candidate seed document 60 and the cluster centers 58, based on seed documents already selected 59, is determined (block 165) as the cosine cos σ of the normalized score vectors 57 for the candidate seed documents 60 being compared. Only those candidate seed documents 60 that are sufficiently distinct from all cluster centers 58 (block 166) are selected as seed documents 59 (block 167). In the described embodiment, a range of 0.10 to 0.25 is used, although other ranges and spatial values could be used, as would be recognized by one skilled in the art.

If the candidate seed documents 60 being compared are not sufficiently distinct (block 166), the candidate seed document 60 is grouped into a cluster 58 with the most similar cluster center 58 to which the candidate seed document 60 was compared (block 168). Processing continues with the next candidate seed document 60 (block 169).

In the second phase, each non-seed document 78 is iteratively processed in an iterative processing loop (blocks 170-176) as follows. The non-seed documents 78 are simply those documents 14 other than the seed documents 60. Again, the similarity between each current non-seed document 78 and each of the cluster centers based on the seed documents 59 is determined (block 171) as the cosine cos σ of the normalized score vectors 57 for each of the non-seed documents 78. A best fit between the current non-seed document 78 and the cluster centers 58 is found subject to a minimum fit criterion (block 172). In the described embodiment, a minimum fit criterion of 0.25 is used, although other minimum fit criteria could be used, as would be recognized by one skilled in the art. If a best fit is found (block 173), the current non-seed document 78 is grouped into the cluster 58 having the best fit (block 175). Otherwise, the current non-seed document 78 is grouped into a miscellaneous cluster (block 174). Processing continues with the next non-seed document 78 (block 176). Finally, a dynamic threshold is applied to each cluster 58 (block 177), as further described below with reference to FIG. 15. The routine then returns.

Figure 15:
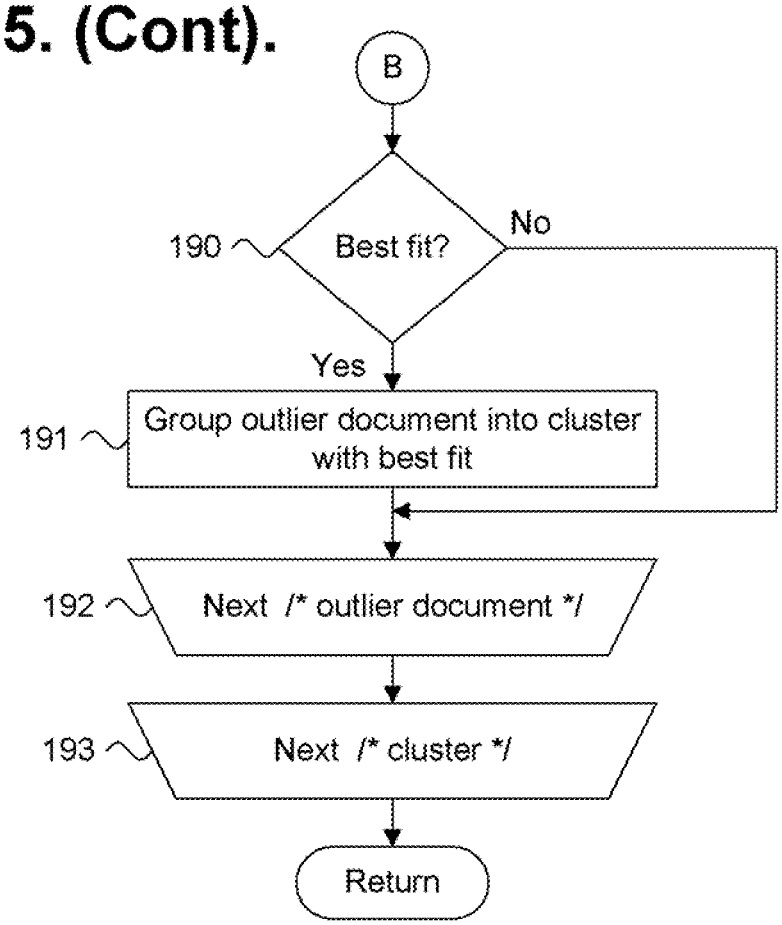
FIG. 15 is a flow diagram showing a routine for applying a dynamic threshold for use in the routine of FIG. 14.

FIG. 15 is a flow diagram showing a routine 180 for applying a dynamic threshold for use in the routine 160 of FIG. 5. The purpose of this routine is to perform "tail cutting" to each cluster 58 by dynamically evaluating and strengthen membership on a cluster-by-cluster basis for use in a further embodiment. Tail cutting creates tighter clusters 58 by identifying and relocating "outlier" documents.

Figure 16:
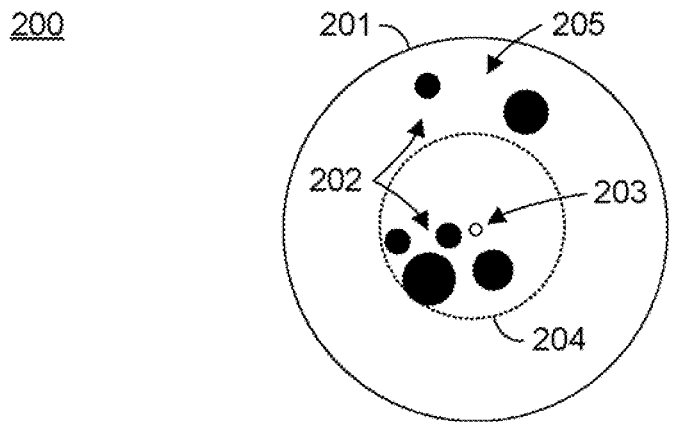
FIG. 16 is a graph diagram showing, by way of example, a dynamic threshold in a cluster of documents.

FIG. 16 is a graph diagram 200 showing, by way of example, a dynamic threshold 204 in a cluster 201 of documents 202. The dynamic threshold 204 is based on an analysis of the similarities of the documents 202 from the center 203 of the cluster 201. Those documents 202 falling outside of the dynamic threshold 204, that is, outlier documents 205, are identified and relocated, if possible, to other clusters.

Referring back to FIG. 15, in applying a dynamic threshold 204, each of the documents 202 in each of the clusters 201 is processed in a pair of iterative processing loops (blocks 181-184) as follows. During each iteration of the outer processing loop (block 181), a current cluster 201 is selected and, during each iteration of the inner processing loop (block 182), a document 202 is selected from the current cluster 201. The similarity to the center 203 of the current cluster 201 for each document 202 is calculated (block 183) and processing continues with the next document 202 (block 184).

Upon completion of the computation of similarity calculations for each document 202, the standard deviation of all documents 202 from the center 203 of the current cluster 201 is determined and a dynamic threshold 204 is set (block 185). In the described embodiment, a dynamic threshold 204 of ±1.2 standard deviations is used, although other dynamic thresholds 204 could also be used, as would be recognized by one skilled in the art. Next, those documents 202 in the current cluster 201, which are outside of the dynamic threshold 204, that is, outlier documents 205, are identified (block 186) and are processed in an iterative processing loop (blocks 187-193) as follows. The similarity between each outlier document 205 and each of the cluster centers is determined (block 188) based on the cosine cos σ of the normalized score vectors 57 for each of the outlier documents 205. A best fit between the outlier document 205 and the cluster centers is found subject to a minimum fit criterion and the dynamic threshold 204 (block 189). In the described embodiment, a minimum fit criterion of 0.25 is used, although other minimum fit criteria could be used, as would be recognized by one skilled in the art. The dynamic threshold 204 used to rescale each cluster-to-document similarity, which enables comparisons of similarities across all available clusters, is calculated in accordance with the equation:

$$similarity_{new} = \frac{similarity_{old}}{(1 - threshold)}$$

where $similarity_{new}$ comprises a new similarity, $similarity_{old}$ comprises the old similarity and threshold comprises the dynamic threshold 204.

If a best fit is found (block 190), the outlier document 205 is grouped into the cluster 58. Otherwise, the outlier document 205 is grouped into a miscellaneous cluster (block 191). Processing continues with the next outlier document 205 (block 192) and the next cluster 201 (block 193), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for scoring concepts in a document set, comprising:
    a database to maintain a set of documents;
    a concept identification module to identify concepts comprising two or more terms extracted from the document set and to designate each document having one or more of the concepts as a candidate seed document;
    a value module to determine for each of the concepts identified within each candidate seed document, values for a frequency of occurrence of that concept within that candidate seed document, a concept weight reflecting a specificity of meaning for that concept within that candidate seed document, a structural weight reflecting a degree of significance based on a location of that concept within that candidate seed document, and a corpus weight inversely weighing a reference count of the occurrence for that concept within the document set according to the equation:

$$rw_{ij} = \begin{cases} \left(\frac{T - r_{ij}}{T}\right)^2, & r_{ij} > M \\ 1.0, & r_{ij} \leq M \end{cases}$$

where $rw_{ij}$ comprises the corpus weight, $r_{ij}$ comprises the reference count for the occurrence j for that concept i, T comprises a total number of reference counts of the documents in the document set, and M comprises a maximum reference count of the documents in the document set;
    a scoring module to calculate a score for each concept as a function of summation of the values for each of the frequency of occurrence, concept weight, structural weight, and corpus weight;
    a vector module to form a vector for each candidate seed document comprising the concepts located in that candidate seed document and the associated concept scores based on the frequency of occurrence, concept weight, structural weight, and corpus weight;
    a document comparison module to compare the vector for each candidate seed document with a center of one or more clusters each comprising thematically-related documents and to select at least one of the candidate seed documents that is sufficiently distinct from the other candidate seed documents as a seed document for a new cluster; and
    a clustering module to place each of the unselected candidate seed documents into one of the clusters having a most similar cluster center.

2. A system according to claim 1, further comprising:
    a similarity module to determine a similarity between each candidate seed document and each of the one or more cluster centers based on the comparison.

3. A system according to claim 2, wherein the similarity is determined as an inner product of the candidate seed document and the cluster center.

4. A system according to claim 1, further comprising:
    a preprocessing module to convert each document into a document record and to preprocess the document records to obtain the extracted terms.

5. A system according to claim 1, wherein the clustering module applies a minimum fit criterion to the placement of the unselected candidate seed documents.

6. A system according to claim 1, further comprising:
    a document relocation module to apply a threshold to each of the clusters, to select those documents within at least one of the clusters that falls outside of the threshold as outlier documents, and to relocate the outlier documents.

7. A system according to claim 6, wherein each outlier document is placed into the cluster having a best fit based on measures of similarity between that outlier documents and that cluster.

8. A system according to claim 1, further comprising:
    a score compression module to compress the concept scores.

9. A method for scoring concepts in a document set, comprising:
    maintaining a set of documents;
    identifying concepts comprising two or more terms extracted from the document set and designating each document having one or more of the concepts as a candidate seed document;
    determining for each of the concepts identified within each candidate seed document, values for a frequency of occurrence of that concept within that candidate seed document, a concept weight reflecting a specificity of meaning for that concept within that candidate seed document, a structural weight reflecting a degree of significance based on a location of that concept within that candidate seed document, and a corpus weight inversely weighing a reference count of the occurrence for that concept within the document set according to the equation:

$$rw_{ij} = \begin{cases} \left(\frac{T - r_{ij}}{T}\right)^2, & r_{ij} > M \\ 1.0, & r_{ij} \leq M \end{cases}$$

where $rw_{ij}$ comprises the corpus weight, $r_{ij}$ comprises the reference count for the occurrence j for that concept i, T comprises a total number of reference counts of the documents in the document set, and M comprises a maximum reference count of the documents in the document set;

calculating a score for each concept as a function of summation of the values for each of the frequency of occurrence, concept weight, structural weight, and corpus weight;

forming a vector for each candidate seed document comprising the concepts located in that candidate seed document and the associated concept scores based on the frequency of occurrence, concept weight, structural weight, and corpus weight;

comparing the vector for each candidate seed document with a center of one or more clusters each comprising thematically-related documents and selecting at least one of the candidate seed documents that is sufficiently distinct from the other candidate seed documents as a seed document for a new cluster; and placing each of the unselected candidate seed documents into one of the clusters having a most similar cluster center.

10. A method according to claim 9, further comprising:
determining a similarity between each candidate seed document and each of the one or more cluster centers based on the comparison.

11. A method according to claim 10, wherein the similarity is determined as an inner product of the candidate seed document and the cluster center.

12. A method according to claim 9, further comprising:
converting each document into a document record; and
preprocessing the document records to obtain the extracted terms.

13. A method according to claim 9, further comprising:
applying a minimum fit criterion to the placement of the unselected candidate seed documents.

14. A method according to claim 9, further comprising:
applying a threshold to each of the clusters and selecting those documents within at least one of the clusters that falls outside of the threshold as outlier documents; and
relocating the outlier documents.

15. A method according to claim 14, wherein each outlier document is placed into the cluster having a best fit based on measures of similarity between that outlier documents and that cluster.

16. A method according to claim 9, further comprising:
compressing the concept scores.

* * * * *